US006854168B2

(12) United States Patent
Booms et al.

(10) Patent No.: US 6,854,168 B2
(45) Date of Patent: Feb. 15, 2005

(54) METHOD AND APPARATUS FOR FORMING OPENINGS IN POLYMERIC TUBING

(76) Inventors: Richard Booms, 2581 Sand Beach Rd., Bad Axe, MI (US) 48413; Ryan Booms, 2600 Murray Rd., Bad Axe, MI (US) 48413; Robert Booms, 2380 Murray Rd., Bad Axe, MI (US) 48413

( * ) Notice: Subject to any disclaimer, the term of this patent is extended or adjusted under 35 U.S.C. 154(b) by 155 days.

(21) Appl. No.: 10/232,020

(22) Filed: Aug. 30, 2002

(65) Prior Publication Data

US 2004/0011174 A1 Jan. 22, 2004

Related U.S. Application Data

(60) Provisional application No. 60/316,893, filed on Aug. 31, 2001.

(51) Int. Cl.[7] .......................... B23P 15/00; B23P 17/00

(52) U.S. Cl. .......................... 29/33 D; 29/26 A; 29/55; 29/53; 408/32; 408/42

(58) Field of Search .............................. 29/33 D, 33 T, 29/26 A, 26 R, 50–55, 564, 565; 408/32–33, 42, 1 R, 50

(56) References Cited

U.S. PATENT DOCUMENTS

| | | | | | |
|---|---|---|---|---|---|
| 1,044,564 | A | * | 11/1912 | Orth | 408/32 |
| 1,101,879 | A | * | 6/1914 | Orth | 408/32 |
| 3,877,831 | A | * | 4/1975 | Maroschak | 408/32 |
| 3,899,265 | A | * | 8/1975 | Lang | 408/50 |
| 3,901,713 | A | * | 8/1975 | Yamasue et al. | 430/564 |
| 3,957,386 | A | * | 5/1976 | Lupke | 408/50 |
| 4,219,293 | A | * | 8/1980 | Licht | 408/1 R |
| 4,898,501 | A | * | 2/1990 | Palmer | 408/32 |
| 5,381,711 | A | * | 1/1995 | Truemner et al. | 83/318 |
| 5,385,073 | A | * | 1/1995 | Truemner et al. | 83/322 |
| 5,572,917 | A | * | 11/1996 | Truemner et al. | 83/322 |
| 5,713,114 | A | * | 2/1998 | Mosiewicz | 29/26 A |
| 5,909,908 | A | * | 6/1999 | Furuse | 29/33 T |
| 5,957,020 | A | * | 9/1999 | Truemner et al. | 83/304 |
| 6,061,905 | A | * | 5/2000 | Logic | 29/33 T |

FOREIGN PATENT DOCUMENTS

FR 2169761 A * 9/1973

* cited by examiner

*Primary Examiner*—Erica Cadugan
(74) *Attorney, Agent, or Firm*—The Weintraub Group, PLC

(57) ABSTRACT

In a method and apparatus for perforating multiwall polymeric cylindrical tubing, a drill head is slidably mounted for reciprocating movement on a support frame between inlet and outlet stations, the drill head having at least one drill for forming an opening in the wall of a length of unperforated tubing. The unperforated tubing is advanced along an axial path and a length thereof positioned in the drill head. The drill head and unperforated tubing are advanced simultaneously from the inlet to the outlet station, in unison and at the same speed, and without clamping the tubing. During this movement, the drill is actuated whereby to form an opening in the tubing material. At the outlet station, the perforated tube material is discharged from the drill head and the drill head is returned to the inlet station receive the next succeeding section of unperforated tubing and repeat the process.

31 Claims, 11 Drawing Sheets

FIG 1
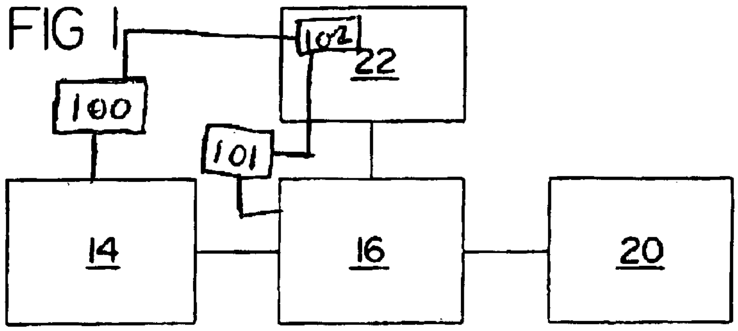
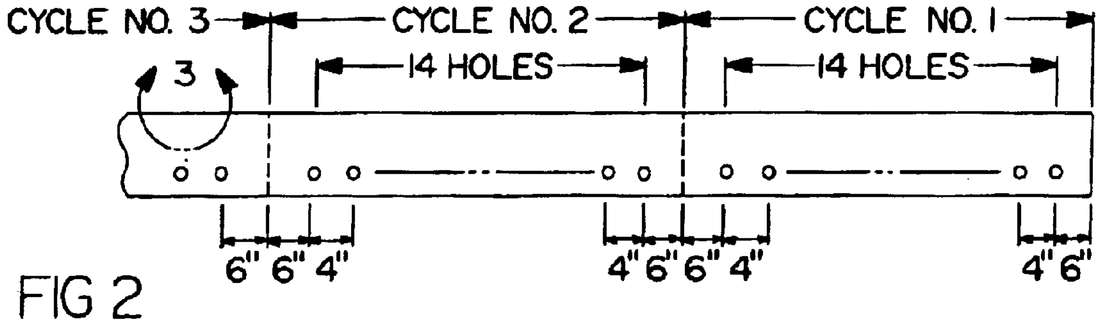
FIG 2
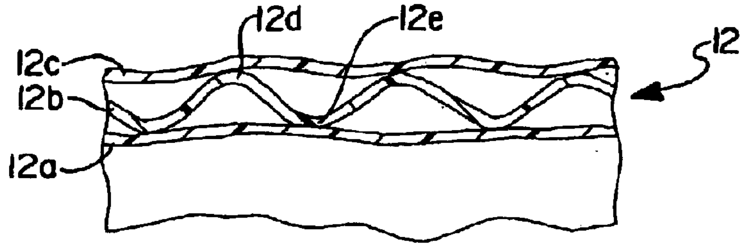
FIG 3

METHOD AND APPARATUS FOR FORMING OPENINGS IN POLYMERIC TUBING

CROSS-REFERENCE TO RELATED APPLICATIONS

This is a Completion Patent Application of co-pending U.S. Provisional Patent Application Ser. No. 60/316,893, filed on Aug. 31, 2001, for "Method and Apparatus For Forming Openings in Polymeric Tubing", the disclosure of which is hereby incorporated by reference.

BACKGROUND OF THE INVENTION

1. Field of the Invention

This invention is generally related to apparatus and method for automatically and continuously drilling, punching, perforating or otherwise producing openings of selected diameter and spacing in polymeric pipe or tube material such as used in underground drainage or air conditioning systems; and more particularly to a method and apparatus wherein a drill head receives an unperforated length of tubing and the drill head and tubing move in synchronization with one another between a tube receiving and tube discharging station during which time drills in the drill head are actuated to form openings in the length of tubing, whereupon the perforated length of tubing is discharged and the drill head returned to receive the next succeeding length of tubing.

2. Related Art

Apparatus for drilling, punching, perforating, or otherwise providing holes or openings of predetermined diameter and spacing in a workpiece are known. Orth U.S. Pat. Nos. 1,1044,564 and 1,101,879 disclose an apparatus wherein drill carriers for boring nail openings in the edge of flooring material are positioned along an oval conveyor belt. The drill carrier and work piece move together in unison as a result of spurs or dogs associated with the drill spindles being rotated by the advancing belt into gripping engagement with the flooring material.

Palmer U.S. Pat. No. 4,898,501 discloses apparatus wherein a continuous length of elastomeric gasket stock is brought into tangential engagement with the outer circumference of a drill wheel. As the stock is advanced, the wheel is rotated and radially arranged drilling units in the wheel are rotated into register with the stock and the stock drilled.

Apparatus for perforating axial sections of corrugated tubing is disclosed in U.S. Pat. No. 3,910,713 (Maroschak); and U.S. Pat. No. 4,219,293 (Licht). In each, and in a manner similar to Palmer, the corrugated tube section is positioned to be tangential to the outer circumference of a radially toothed drive wheel and radial teeth in the wheel engaging with corrugations in the tube section. As the wheel is rotated, the teeth engage with successive of the corrugations, causing the tube section to move and successive radially arranged drill units in the wheel to rotate into register with and drill the tube section.

U.S. Pat. Nos. 5,572,917; 5,385,073; 5,381,711; and 5,957,020, each issuing Truemner et al., disclose apparatus for perforating corrugated tubing, which apparatus includes an array of multiple feeder-cutter wheels that operate to drive tubing through the apparatus and concurrently perforate the tubing in the valley of its corrugations.

While believed suitable for their intended purposes, the apparatus disclosed herein above have disadvantages, such as being complex, expensive, not dependable, and possibly not capable of being modified to produce multiple openings in smooth-walled tubing, in a continuous, automatic manner, whether the tubing is single or multi-walled.

Heretofore the forming of multiple and/or uniform openings in both smooth-walled and multiple walled corrugated tubing has presented problems. The reason for this is believed to be that as the tube section is moved past a succession of drill spindles, the openings are not drilled exactly in synchronous relation to one another, thereby leading to splitting of the tube and possibly tool breakage. As a result, the part may have to be scrapped, the tool replaced and the production stopped.

SUMMARY OF THE INVENTION

This invention is concerned with apparatus for perforating tubing, which tubing is advantageously used as underground drainage piping, which piping requires openings or perforations along its length to enable water to operatively percolate into the piping through the perforations therein for drainage therealong. One skilled in the art would appreciate that selectively perforated tubing is desirable in other applications such as in ducts used in heater/defroster air conditioning systems.

In particular, according to the invention herein, there is provided apparatus that is relatively simple, operable on tubing which is axially elongated, smooth-walled and corrugated in cross-section, and single or multi-walled, and provides at least one and preferably an array of holes, openings, perforations, slots and the like of predetermined size and relationship along the tube length of and through both the peaks and the valleys of the corrugated cross-section. Such tubing may be of blow-moldable or vacuum formable materials, such as polyethylene, HDPE, polyvinyl chloride, polypropylene, nylon, or Teflon®.

It is further proposed herein that the apparatus according to the invention herein form the perforations in such tubing by receiving the unperforated tubing after its formation in, for example, a blow-molding apparatus, in which the perforation or opening forming tool is engaged with the wall (or walls) of the tubing to form the requisite opening.

Additionally, the apparatus according to the present invention desirably presents the perforated section of tubing to a cutter or tube severing apparatus, such as a flying ram, in which a cutter or like blade element is brought into engagement with the wall (or walls) of the tubing to sever the perforated end portion of the tubing from the extruded tubing presented to the apparatus.

According to the present invention there is provided apparatus for automatically and continuously producing openings of selected diameter and spacing in polymeric tube material such as used in underground drainage or air conditioning systems, the apparatus comprising:

a carriage or drill head adapted to receive a length of tubing, said drill head including at least one actuatable tool for forming an opening in the wall of said tubing; and first means for automatically moving the drill head oppositely in first and second directions, respectively, between a tube receiving and a tube discharging station, the first means for moving operating in the first direction to simultaneously move the drill head in unison with the length of tubing and also to actuate the tool to form an opening in the length of tubing and in the second direction to move the drill head back to the tube receiving station to receive the next succeeding length of tubing and repeat the process.

According to the invention, the drill head is mounted on a support frame for slidable movement between the tube receiving and tube discharging stations, the actuatable tool comprises a linear array of actuatable drill bits each for forming at least one opening in the wall of the tubing, and the first means comprises a threaded shaft and screw nut, the shaft being mounted to the drill head for rotation relative thereto and the screw nut extending from the frame and threadably engaged with the thread on the shaft, wherein rotation of the threaded shaft is transmitted to the nut and the drill head is axially advanced away from or towards the inlet station, depending on the sense of shaft rotation.

Desirably, the apparatus for automatically and continuously producing openings further comprises:

said support frame including said inlet and outlet stations and forming an axial path therebetween, second means for feeding tubing to said inlet station, said second means moving said tubing at a predetermined speed along said axial path and advancing the forward end of the tubing from the inlet station and to the outlet station and positioning the axial end portion of the tubing that was operated upon by the tool adjacent to the outlet station, and second means for severing the axial end portion that was operated on from the tubing.

According to this invention, the second means is an extruder which forms and feeds tubing material to the drill head, and the second means is at least one cutter mounted in the path of and intersects the tubing, the cutter moving in a plane substantially at right angles to the axial path of the tubing for intermittent intersection of the tubing by the cutter.

The present invention is also concerned with a method of perforating tubing, and it is a primary object of a further aspect of the invention to provide such a method.

According to this further aspect of the present invention there is provided a method of perforating tubing, the steps of the method comprising sidably mounting a drill head for reciprocating movement on a support frame, the drill head having at least one drill for forming an opening in the wall of the tubing, advancing the tubing along an axial path and into the drill head, and simultaneously advancing both the drill head and the tubing material at the same speed without clamping the tubing and also actuating the drill and forming an opening in the pipe, and discharging the perforated tube portion and returning the drill head to the next succeeding section of unperforated tubing and repeating the process.

Further, the steps of the method include feeding the tubing to the drill head from an extruder, and feeding and severing the perforated tubing from the extruded tubing being advanced to the drill head.

According to this invention, the process automatically operates to form, feed, and intermittently sever lengths of polymeric tubing in a continuous operation. In the first aspect, an endless length of corrugated tubing is formed by an extrusion process, such as blow-molding or vacuum forming, fed to the inlet station, and advanced into operative relation with the drill press. After being operated on by the drill head, the perforated length of tubing is positioned at the outlet station and severed. The extruder and severing apparatus are known to those skilled in the art and will not be discussed further.

Importantly, and according to this invention, the carriage and tubing are moved in unison with one another, during which time the drill head drills the holes or openings through the wall(s) of the tubing. In this regard, a first optical encoder or sensor is associated with the extruder and provides a first signal indicative of the speed at which the extruded plastic tubing is being fed to the drill carriage, a second optical encoder or sensor is associated with the drill press and provides a second signal indicative of the speed of the carriage, and a comparator is provided to read and compare the first and second signals and generate a signal to adjust the speed of one or both of the extruder and drill head as needed to ensure that the drill head and tubing are moving at the same, or substantially the same speed.

The comparator is operatively connected to a central server computer and programmed to compare the first and second signals and ensure that the motor operably connected to the ball screw drive shaft rotates the shaft at a rate that forces the drive head to move substantially in unison (i.e., is synchronous) with the tubing supplied to the drill press.

In order that the present invention may be more clearly understood and more readily carried into effect the same will now, by way of example, be more fully described with reference to the accompanying drawings in which:

DETAILED DESCRIPTION OF THE DRAWINGS

FIG. 1 is a block diagram of a system for forming openings in the wall of polymeric tubing.

FIG. 2 is a view of a piece of tubing, according to this invention, provided with perforations through the wall thereof.

FIG. 3 is a partial section view taken along line 3—3 of the tubing shown in FIG. 2.

DETAILED DESCRIPTION OF PREFERRED EMBODIMENTS

Figure 4:
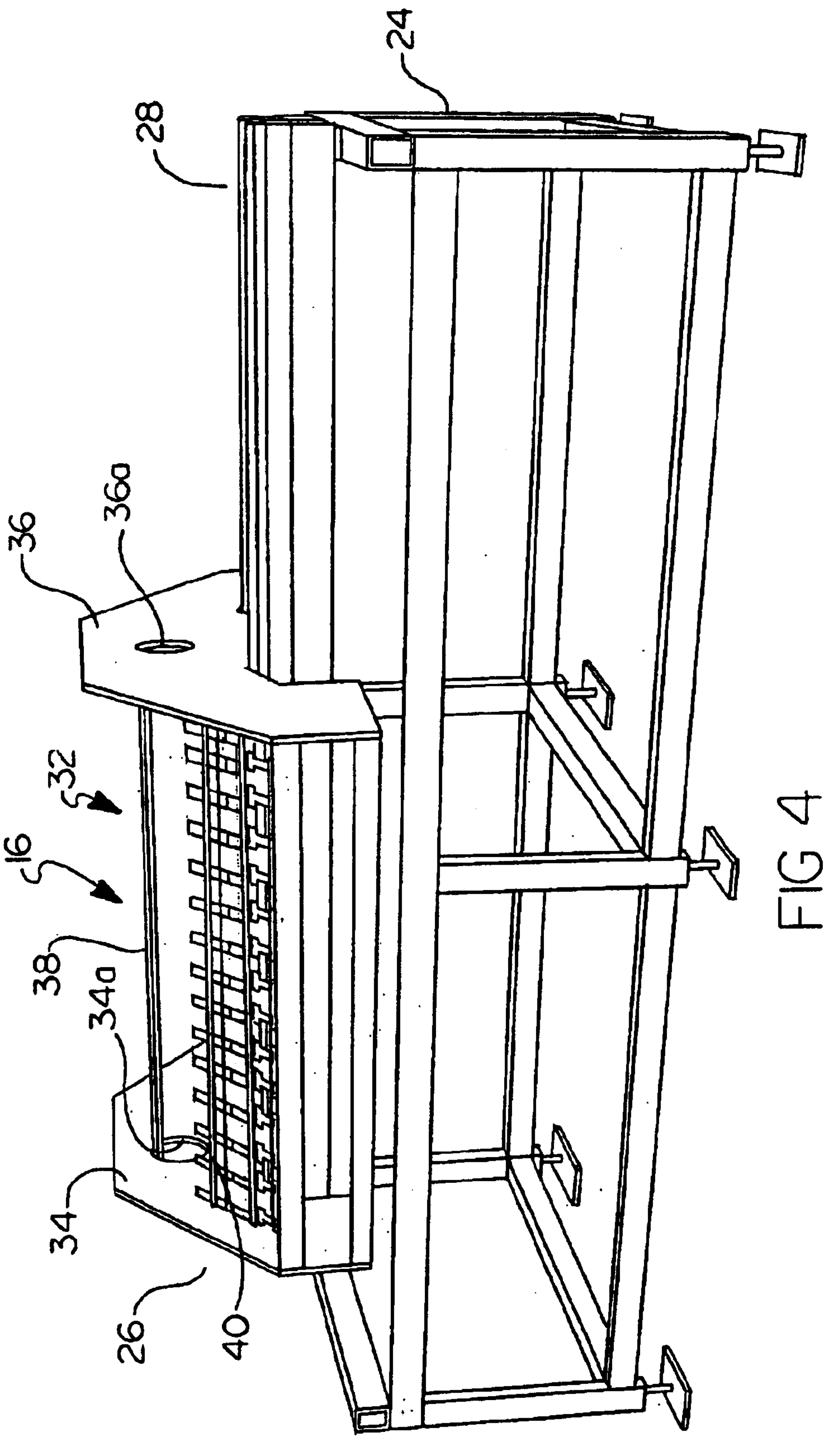
FIG. 4 is an elevation view of a drill press according to this invention.
Figure 5:
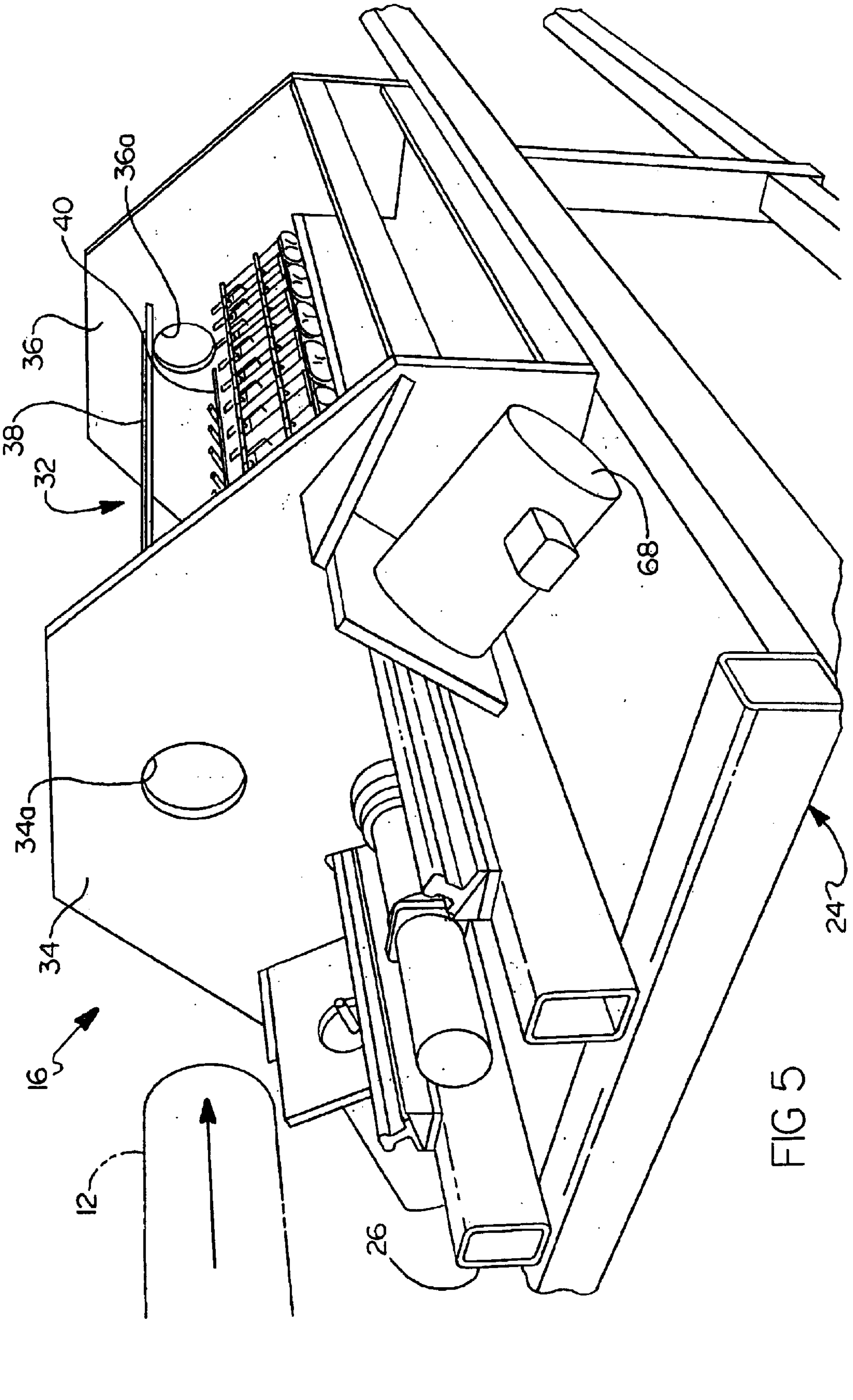
FIG. 5 is an end view of the drill press illustrating the tubing positioned for entry through openings in opposite end walls of the drill press.
Figure 6:
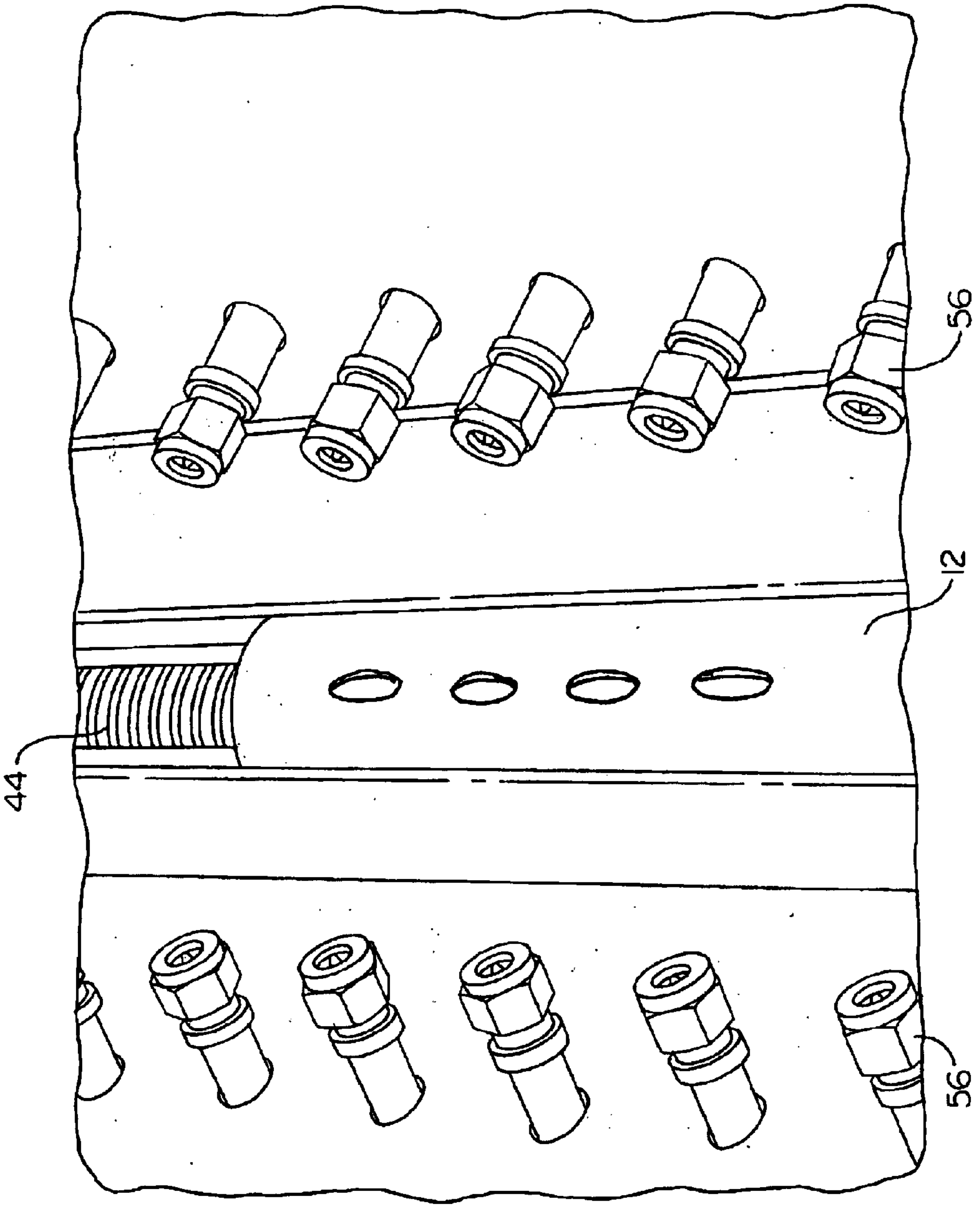
FIG. 6 is a view looking downwardly of the drill press and the relationship of tube relative to guide rails and drill spindles of the drill press.
Figure 7:
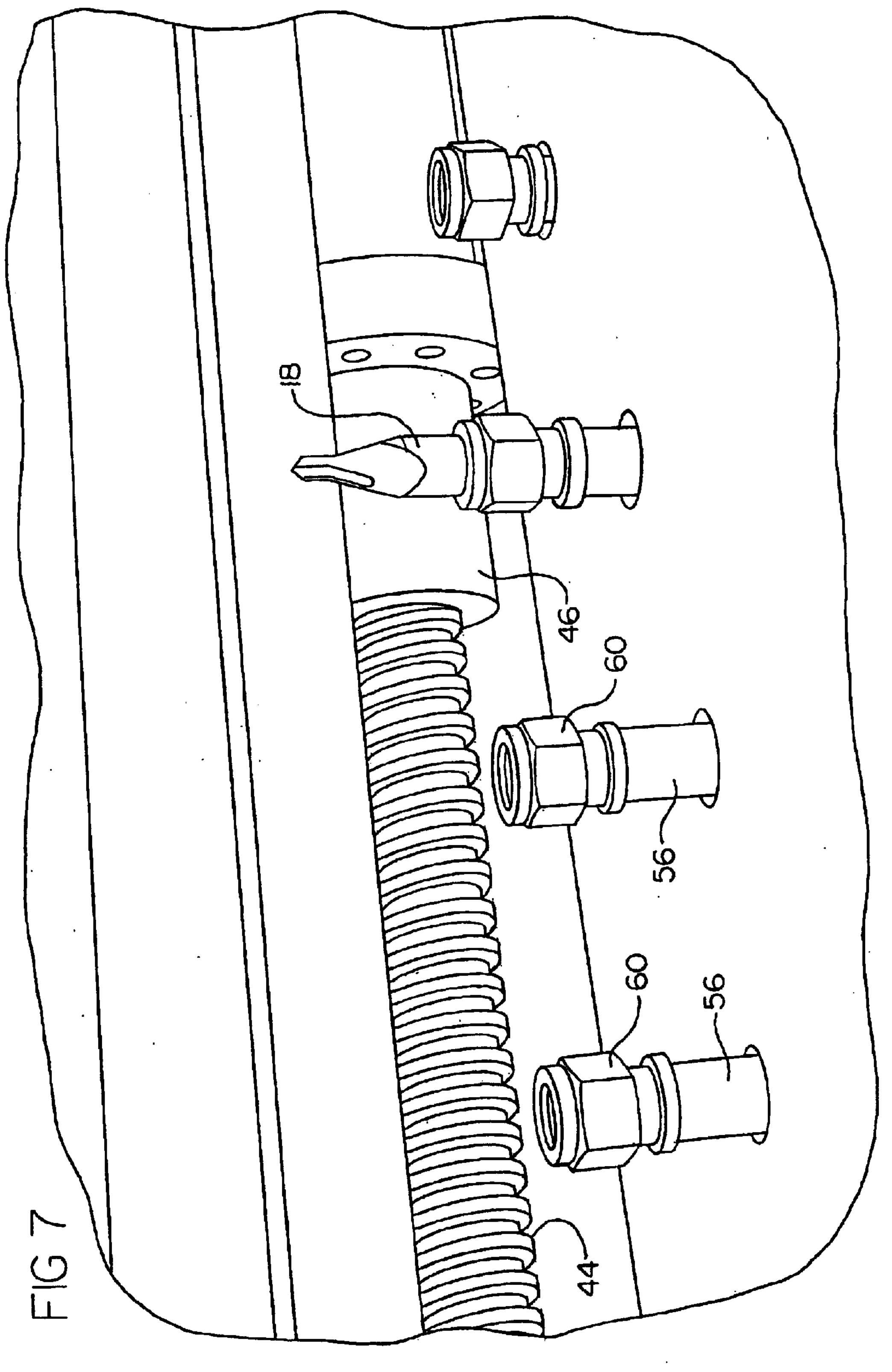
FIG. 7 is similar to FIG. 6 and is a view looking downwardly of the drill press with the tube material removed to show a ball screw and ball screw not used to drive the drill press.

Referring to the drawings, FIG. 1 shows an apparatus or system according to a preferred embodiment of this invention, generally indicated by the number 10, for automatically and continuously perforating or otherwise producing openings of selected diameter and spacing in an endless length of polymeric pipe or tube material 12 such as used in underground leaching and draining systems. In a preferred embodiment according to this invention, the apparatus or system 10 comprises an extruder 14 which forms and discharges an endless length of hollow cylindrical tube material 12, a drill press 16 which receives the tube material discharged from the extruder 14 and has tools or drill members 18 to perforate the tube material as desired, a cutter member 20 which severs the perforated end portion of the tube material, and a central control system 22. The extruder 14 is conventional and would be known to one skilled in the art and will not be described further.

As used in the discussion to follow, it is to be understood that the term hollow cylindrical tube material or tubing also refers to piping and like structures that are axially elongated, hollow, thin-walled, and generally cylindrical. Additionally, while described in connection with on-line operations wherein an endless section of hollow tubing is fed to the drill press and then severed into a desired length, the drill press 16 is applicable to off-line operations and the provision of perforations in stick or pre-cut sections of tube stock.

Further, while described as a drill press for providing perforations in cylindrical tubing, it is to be understood that depending on the tool utilized, the tools of the drill press 16 operate to engage the wall of the tube to drill, punch, sever or otherwise provide perforations, openings, holes, slots or like discontinuities through the material of the tube wall.

Turning to FIGS. 2 and 3, according to a preferred embodiment, the tube material 12 is generally cylindrical, hollow, and is comprised of three generally concentric cylindrical walls, including an inner wall 12*a*, a center wall 12*b*, and an outer wall 12*c*. The center wall 12*b* is corrugated and comprises a continuous succession of longitudinally spaced undulations or cylindrical ribs and is characterized by a succession of respective peaks and valleys 12*d* and 12*e*. The inner and outer walls 12*a* and 12*c* encircle the center wall 12*b* and form a cylindrical tube structure having generally smooth inner and outer surfaces.

Preferably, the tube material 12 is comprised of a suitable blow-moldable or vacuum formable material, such as polyvinyl chloride, polyethylene, HDPE, polypropylene, nylon, or Teflon®. While shown as being three walled, the tube operated on can be single or double walled.

The drill press 16 herein is adapted to operate on tube wall that is smooth or corrugated, and single or multi walled. Further, the drill press is capable of simultaneously forming a plurality of clean, round holes in either the peaks or the valleys of corrugated tube material.

The cutter member 20 is conventional and is known by one skilled in the art. Illustrative is a flying ram. Although the cutter member 20 will not be described in any great detail, the cutter member includes at least one blade element that is mounted in the path of and intersects the tubing. The cutter blade moves in a plane substantially at right angles to the axial path of the tubing for intermittent intersection of the tubing by the cutter to sever the perforated end portion of the tubing from the unperforated tubing presented to the drill press by the extruder.

Turning to FIGS. 4–11, the drill press 16 comprises a support frame 24 defining an inlet and an outlet station 26 and 28, a pair of linear rails or tracks 30 extending horizontally between the stations and defining an axial path therebetween, and a carriage or drill head 32 mounted on the rails for axial horizontal sliding movement therealong and between the stations. The inlet and outlet stations 26 and 28 are positioned in operative juxtaposed relation, respectively, with the extruder 14 and the cutter member 20. As shown best in FIGS. 9B and 10, the linear rail 30 includes a flat base 30*a*, which is connected to the support frame 24, a cylindrical guide rail 30*b*, which supports the drill head or carriage 32, and a tapered central body 30*c*, which connects the base 30*a* to the guide rail 30*b*.

The drill head 32 includes a pair of axially spaced end walls 34 and 36 and is mounted for horizontal movement relative to the frame 24. The end walls 34 and 36 are generally vertically disposed and each is provided with a respective circular opening 34*a* and 36*a*, the openings being substantially of the same diameter, coaxially aligned with one another, and having their respective centers on a common central axis. The end wall openings 34*a* and 36*a* are of a diameter slightly greater than, and sufficient to pass, the tubing material, whether fed to the drill head or carriage 32 automatically and/or continuously by the extruder, or otherwise, such as if individually fed.

Preferably and according to this invention, a pair of upper guide plates 38 and a pair of lower guide plates 40 extend horizontally between the end walls 34 and 36 for axially centering, supporting, and guiding the tube material advanced into and through the axial space formed between the end walls of the carriage 32. The guide plates 38 and 40 are generally flat, rectangular, and have, respectively, an elongated edge 38*a* and 40*a*, and a pair of spaced axial end faces 38*b* and 40*b*. So mounted to the movable drill head 32, the respective guide plates 38 and 40 are disposed generally radially along a respective radius through the central axis. Further, the elongated edges 38*a* and 40*a* are disposed in parallel relation to one another and extend along the outer cylindrical surface of an imaginary cylinder, which cylinder has a diameter slightly less than that of the openings 34*a* and 36*a* and has an axis that is maintained in parallel, and in some cases concentric, relation with the central axis.

Figure 10:
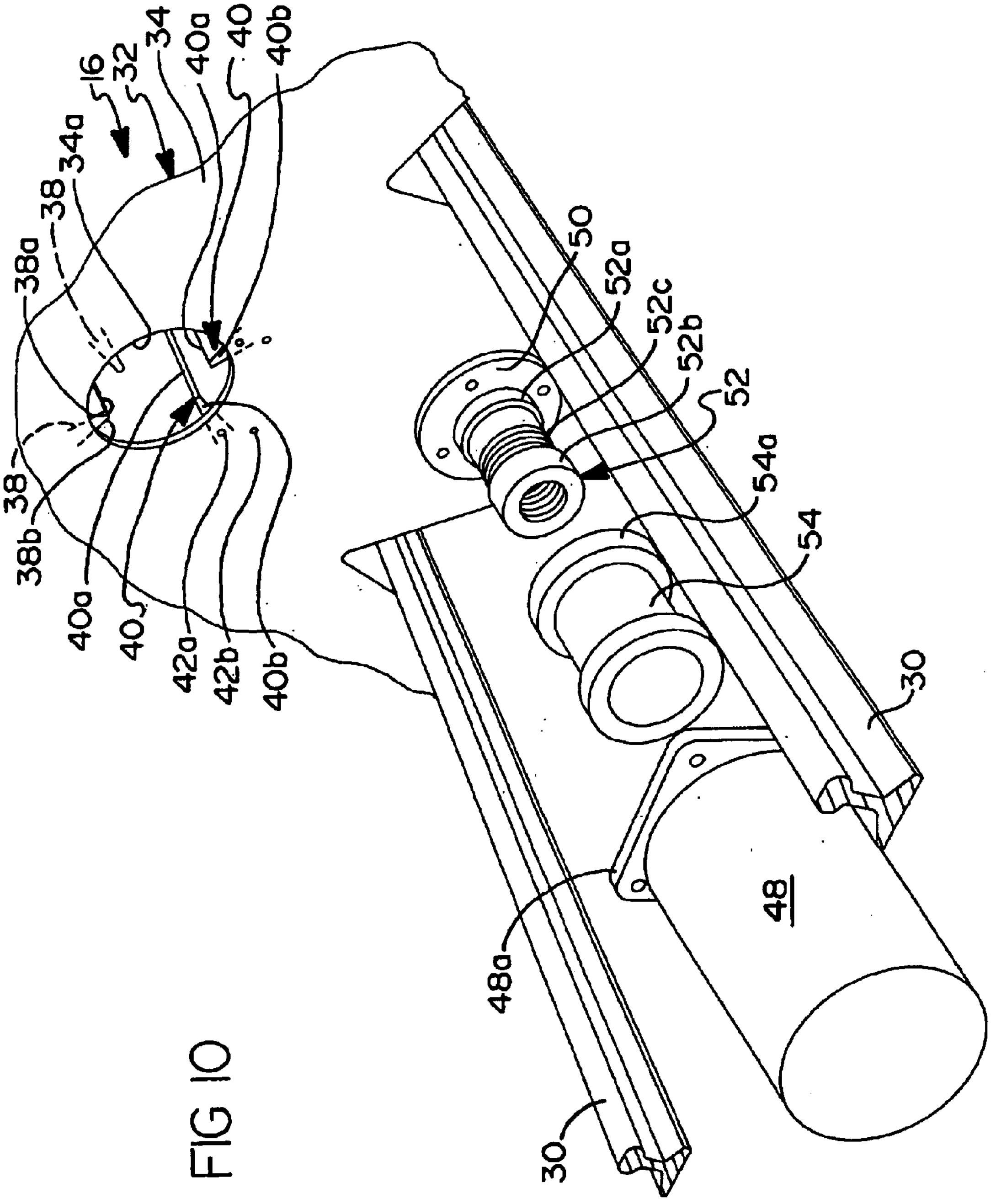
FIG. 10 illustrates the mounting of the drive motor to connection to the ball screw drive shaft in the drill press.

As shown best in FIG. 10, the upper guide plates 38 are disposed at an acute angle to one another and the elongated edges 38*a* extend downwardly from the frame structure, and towards one another and the central axis. So positioned, the opposite axial end faces 38*b* have a portion disposed within the openings 34*a* and 36*a*. The elongated edges 38*a* are adapted to inhibit upward movement of the tube material from the central axis during the perforating process.

The lower guide plates 40 are disposed at an acute angle to one another and the elongated edges 40*a* extend upwardly from the frame structure, and towards one another and the central axis. So positioned, the opposite axial end faces 40*b* have a portion disposed within the openings 34*a* and 36*a*. The elongated edges 40*a* form an axial cradle, or support rails, over which the tube material passes during the perforating process.

Further, tube material of different diameter is centered and constrained for parallel axial movement along the axial path by the provision of adjustment screws 42*a* and 42*b* that connect the two spaced end walls 34 and 36 to the two lower guide plates 40. As shown, the adjustment screws 42*a* and 42*b* are threadably engageable with one of a plurality of threaded bores (not shown) provided in the opposite axial end faces 40*b* of each lower guide plate 40. Depending on the threaded bore selected, the guide plates 40 can be moved vertically upwardly (or downwardly) relative to the respective end walls 34 and 36 and the guide plate edges 40*a* positioned within a respective opening 34*a* and 36*a*, whereby to enable tubes of different diameter to be centered relative to the openings when the tubing is disposed between the end walls 34 and 36.

An axially elongated rotatable ball screw or helically threaded shaft 44 is mounted on the support frame 24 for rotation relative thereto and a ball screw nut 46 is fixedly connected to the drill head 32 and threadably engaged with the thread of the ball screw shaft 44. The opposite axial end portions of the threaded shaft 44 are journalled for rotation in a respective bearing support 50 mounted in each endwall 34 and 36.

Threadable engagement between the screw shaft 44 and the screw nut 46 is such that upon rotation of the screw shaft 44, torque is transmitted to the screw nut 46 and the drill head 32 is moved between the opposite end stations 26 and 28 of the frame 24. Rotation of the screw shaft 44 in one direction (e.g., clockwise) operates on the screw nut 46 to axially drive and move the drill head 32 in a first direction, such as from the inlet station 26 to the outlet station 28. Rotation of the screw shaft 44 in a second and opposite direction (e.g., reversed and rotated in a counterclockwise direction) operates to drive the drill head 32 in a second and opposite direction, such as from the outlet station 28 back to the inlet station 26, whereby to repeat the process.

A drive motor 48 has a mounting flange 48*a*, fixedly connected to the end wall 34, and a drive shaft (not shown). The motor drive shaft is operably connected in driving relation to one end portion of the ball screw shaft 44 (e.g., the end journalled in the bearing support 50 mounted in the end wall 34) whereby to rotate the ball screw shaft and axially reciprocate the drill head 32.

Preferably, and according to this invention, a flexible cylindrical coupling 52 is used to connect the motor drive shaft to the ball screw shaft 44. Desirably, such connection permits a small amount of misalignment between the axes of the motor drive shaft and the ball screw shaft, such misalignment possibly leading to destruction of the drive motor 48.

In the partial disassembly illustrated in FIG. 10, the flexible coupling 52 has a rearward end 52*a* fixedly connected to the end wall 34, a forward end 52*b* connected to the drive motor 48, and a resilient medial portion 52*c*, such as formed by a corrugated or bellows-like member. Desirably, the resilient medial portion will enable the forward end portion to deflect and allow for axial misalignment between the drive shaft and the driven shafts. To control the amount of shaft deflection permitted, a rigid cylindrical support collar 54 is circumposed about the flexible coupling 52, with one end 54*a* of the support collar being fixedly secured to the bearing support 50.

Importantly, the ball screw and drive motor arrangement provides a low wear drive mechanism, and permits extremely precise positioning of the carriage relative to the frame, and provides excellent speed capabilities. For example, in an illustrative embodiment, the ball screw and motor drive arrangement was able to move the carriage in side-by-side relation with and simultaneously perforate tube material moving at over 110 ft/min.

Preferably, due to the high speeds of production and for safety considerations, a brake motor is connected to the ball screw to stop rotation of the ball screw and advance of the drill head. The brake motor is not shown as being conventional and known by one skilled in the art.

Referring to FIGS. 5, 6, 7, and 8A and 8B, the drill head or carriage 32 is axially elongated and, in the embodiment shown, provides two rows of actuatable drill spindles 56 between the end walls 34 and 36. Each drill spindle 56 is mounted for movement in a cage or frame-like member 58 and is adapted to receive a drill bit 18 (e.g., see FIG. 7). In the mounting arrangement shown, the cages 58 are fixedly mounted to and carried by the carriage 32 during the horizontal reciprocating movement of the carriage. The drill spindles 56 are connected to a respective cage 58 for movement radially inwardly and outwardly (i.e., towards and away from) the tube material and the central axis thereof, simultaneously with and during movement of the carriage 32.

The arrangement shown illustrates an embodiment for automatically simultaneously drilling 28 holes through the wall of the tube 12. That is, there are two angularly spaced, linearly extending, rows of drill spindles 56, each row including fourteen drill spindles, and each drill spindle including a drill 18. However, depending on the application, the user can increase (or decrease) the number of rows used, or the number of drill spindles per row, or the number of drills 18.

The drill spindles 56 include actuators or air cylinders that are connected to a source of pressurized air (not shown) which when actuated cause the drill spindle to move relative to its cage either in a first direction toward the tube material or in second direction away from the tube material. The drill bits 18 in each respective row are generally coplanar with one another and the planes of each respective row are at an acute angle to a plane angled downwardly towards the ball screw 44. So mounted, each drill bit is generally radially directed and mounted for rotation in the respective drill spindle 56 for rotation about an axis of rotation that is generally radially directed.

Desirably, the carriage or drill head 32 can be retooled very quickly in that the drill bits may be replaced, such as when dull or if broken, or to enable larger and/or smaller diameter holes to be produced. Each drill spindle 56 has a collet 60, which enables the diameter or length of a drill bit 18 to be changed. Advantageously, the compact mounting reduces cost and space requirements.

Each drill spindle 56 further includes a pair of sensors 62 and 64 to indicate whether the spindle is remote to the tube material (i.e., retracted) or inwardly and in position for perforating the tube material, or direct that the spindle position be changed. The sensor information is fed back to the central control system 22 for operation purposes.

Figure 8A:
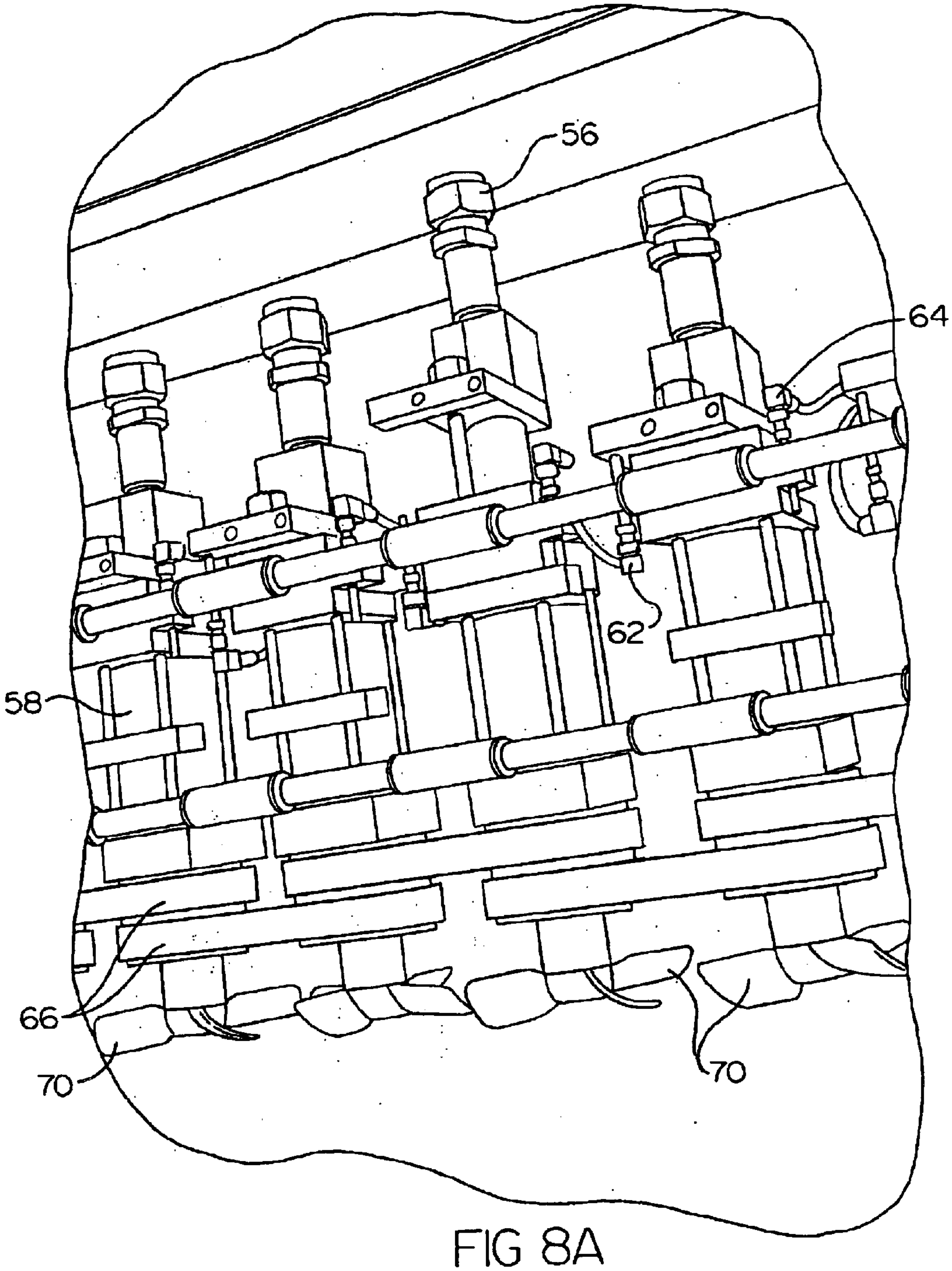
FIGS. 8A and 8B are enlarged views of a portion of a row of drill spindles illustrating drill spindles in retracted and actuated states, a drive belt arrangement for rotating drill bits in the drill spindles and cooling fans, and air lines for actuating the spindles between the retracted and actuated states.
Figure 8B:
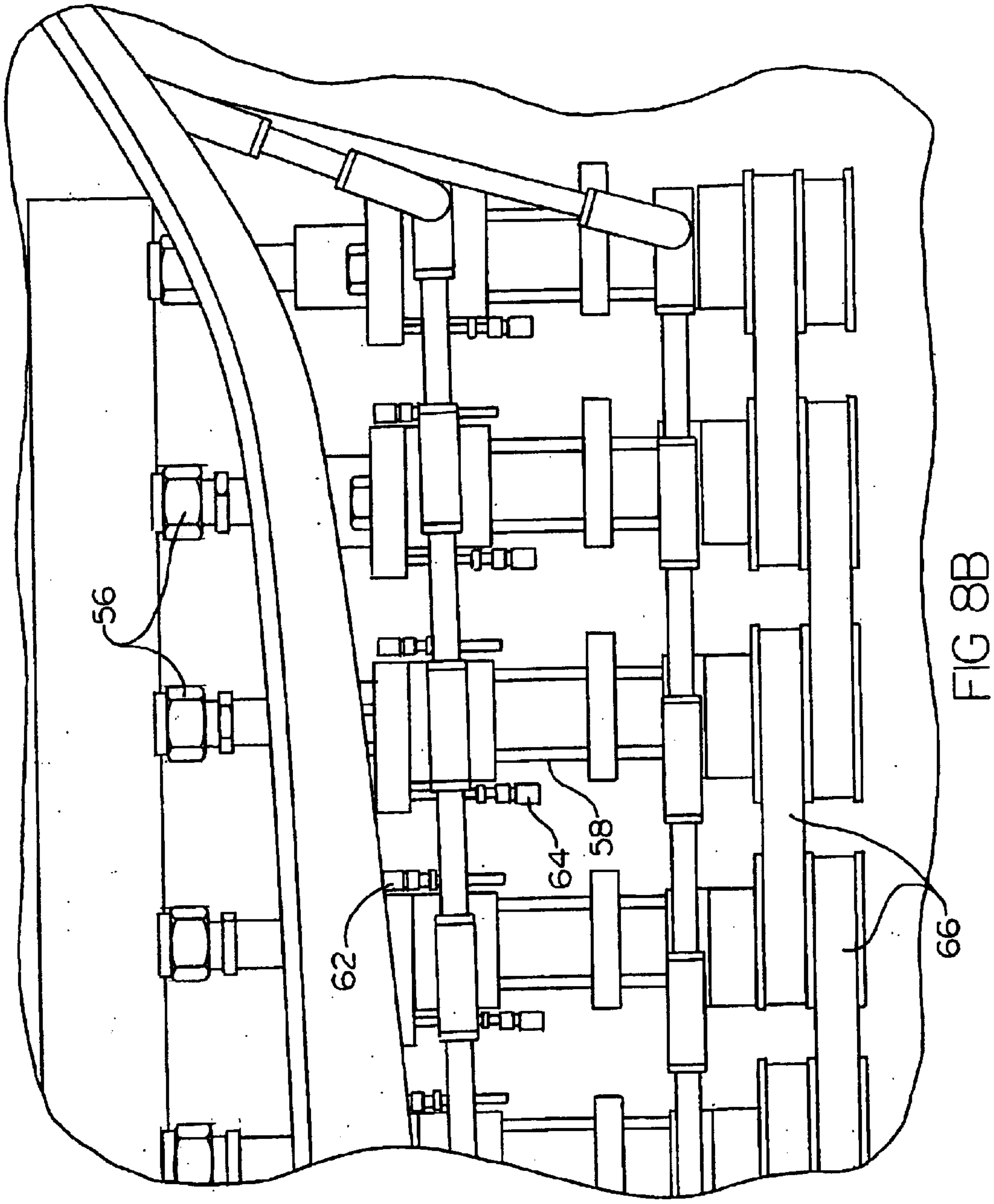
Figure 9A:
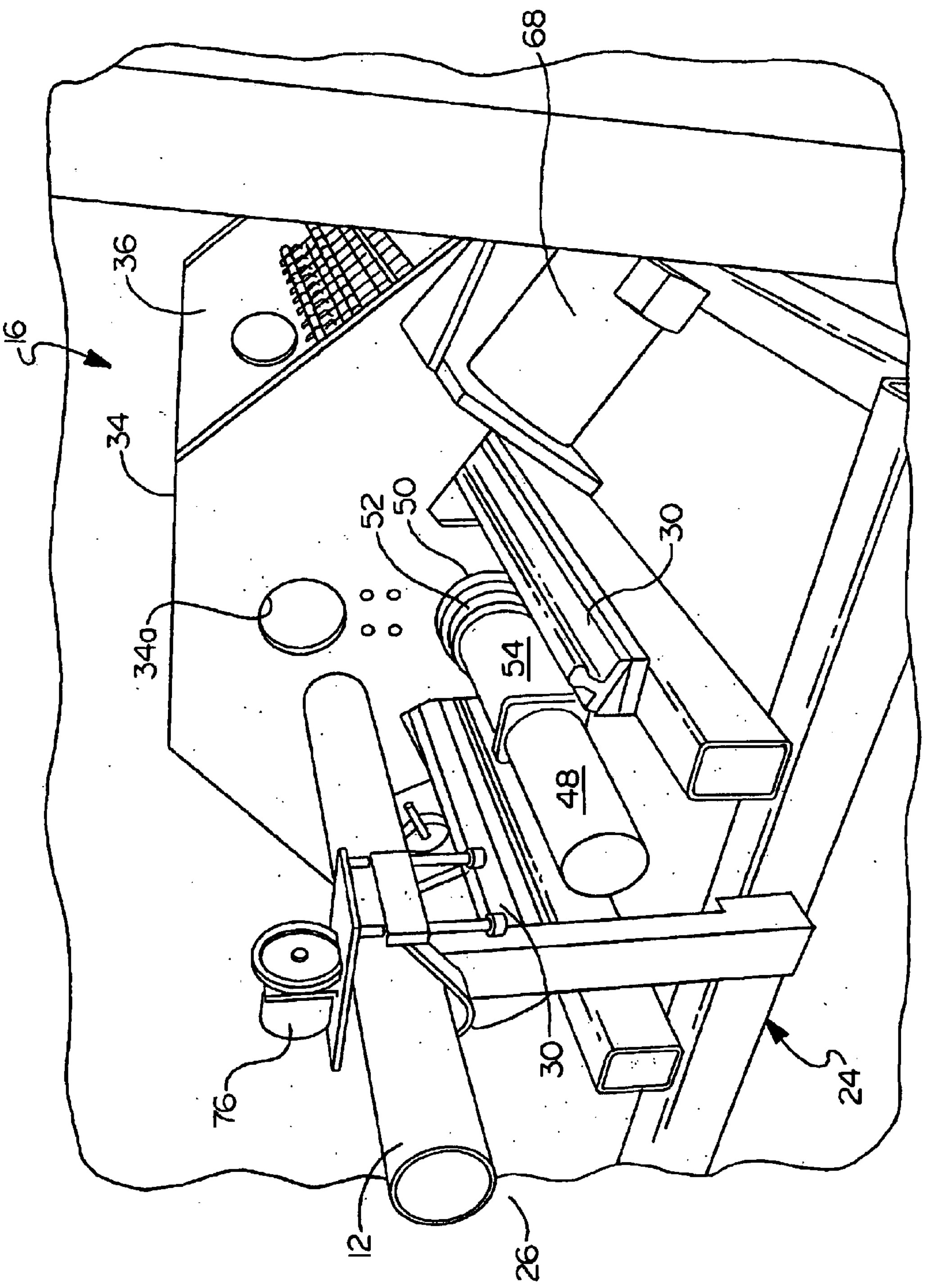
FIGS. 9A and 9B illustrate the inlet station with the drill press positioned on linear guide rails and a tube positioned relative to an optical encoder for entry into the drill press.
Figure 9B:
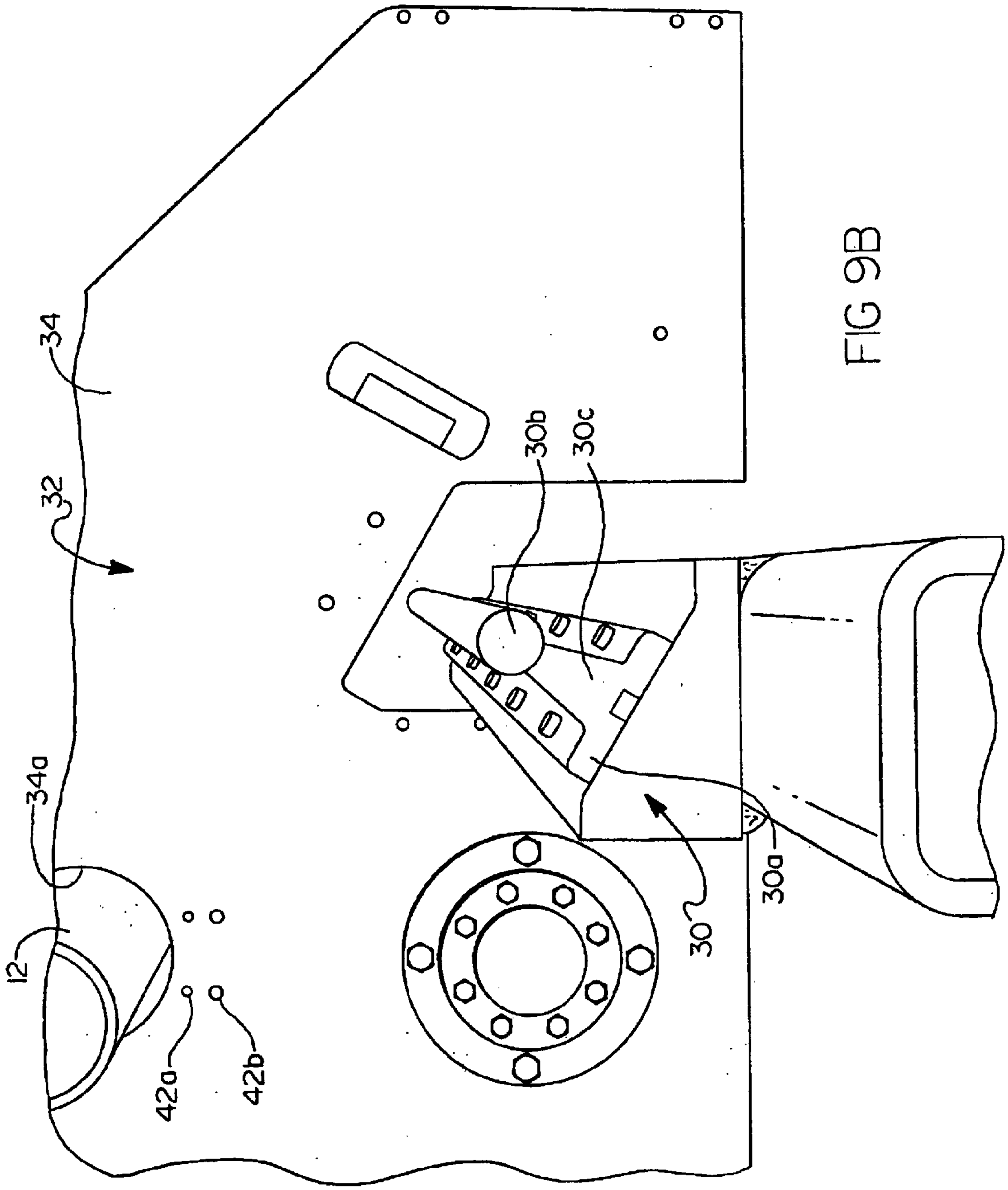

As shown in FIGS. 8A and 8B, the drill bits 18 are driven by a series of drive belts 66, which interconnect with pulleys extending from the respective drive spindles 56 and to a drive motor 68. Preferably, each row of drill spindles is interconnected to a respective drive motor by associated pulleys and drive belts.

In one application, a 2 HP AC motor was used to drive the belts 66 and a fan 70 was connected to each pulley. In a typical operation, the drill spindles are driven at about 3,500 rpm and develop considerable heat. The individual fans 70 operate to cool the drive belts 66 during operation to increase the life of the drive belts, as well as to cool the tube material worked on. To further increase the life of the drive belts, the central control system 22 is connected to and programmed to send a control signal to each of the spindle drive motors, which signal operates to pulse the drive motors on and off.

The drill spindles 56 and associated drill bits 18 are adapted to be actuated and driven radially inwardly towards the tube material fed into the carriage by an amount sufficient that each drill bit will engage, be rotatably driven and drilled through the wall of the tube material, and be pulled radially outwardly and away from the tube material. Air actuators, drive motors 68 and associated drill spindles 56 of each row are connected to and controlled by the central control system 22.

Figure 11:
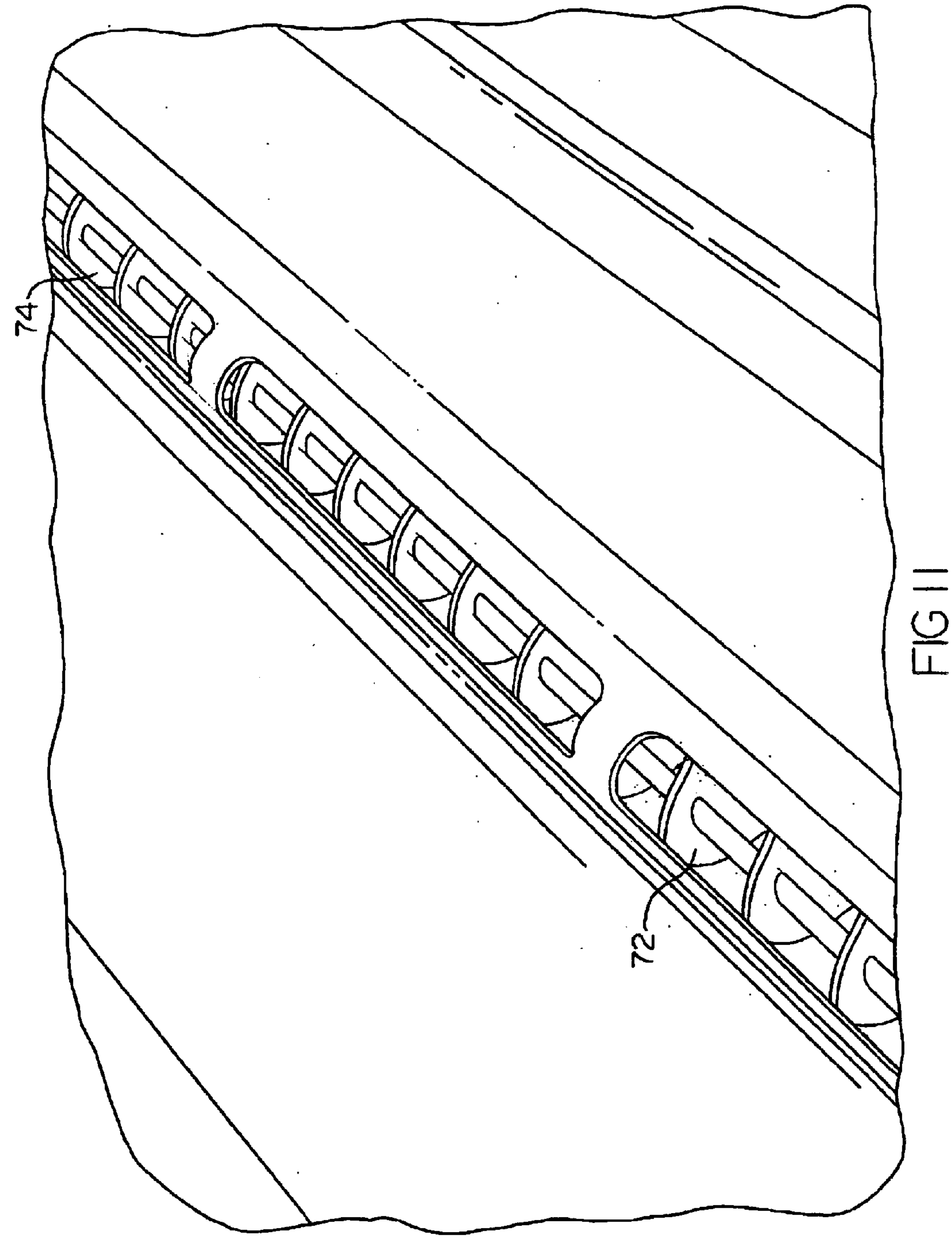
FIG. 11 illustrates an auger arranged for removing chips and debris from the drill press.

Further, as shown in FIG. 11, a waste removal arrangement is provided to automatically remove chips and other debris that may be formed during the drilling operation. According to this invention, a V-shaped trough 72 extends downwardly from and is disposed below the ball screw shaft to accumulate debris. Further, an axially extending auger 74 is rotatably disposed in the bottom of the trough with rotation of the auger operating to push the along the bottom of and outwardly of the trough.

In operation, the extruder 14 forms and feeds tube material 12 into the carriage or drill head 32 at a predetermined speed. The advancing tube material triggers an optical sensor in the extruder, with further advance starting the motors, triggering an optical encoder. The optical sensor and optical encoder are included in a first assembly 100 that is operatively associated with the extruder 14. The control system program 22 allows a certain amount of tube material to enter and pass through the carriage 32, and then actuates the bail screw drive system to move the carriage.

Importantly and critical to this invention is the fact that the speed of the tube material being fed into the frame and disposed in the carriage and the speed of the carriage both be the same and move at substantially the same rate of speed. The two move together in unison (i.e., synchronized), there is no relative movement between the carriage 32 and the tube material 12 being perforated, and the carriage does not clamp onto the tube material.

Substantially simultaneously with this synchronous movement of the tube material 12 and drill head 32, the control system 32 transmits an actuation signal to the drill spindles 56, thereby synchronously actuating the drive belts 66, the drill bits 18 and the air cylinders. The respective air cylinders force the drill spindles 56 and their associated rotating drill bits 18 radially inwardly towards the tube material, ultimately driving the rotating drill bits through the wall of the tube material. The upper and lower guide plates 38 and 40 operate to center the tube portion between the end walls 34 and 36 relative to the drill head 32 during the drilling operation. Thereafter, the control system 22 transmits a de-actuating signal to the drill spindles 56, causing the drive motors 68 to stop, the drill bits 18 and the drive belts to stop rotating, and the drill spindles to retract.

The central control system 22 constantly "tracks" the position of the tube material and the "perforated" portion of the tube material in relation to the frame and the carriage with the drill spindles 56. Approximately at the time the drill spindles have been retracted, the control system sends a signal to the cutter directing that the tube be severed proximate to the trailing end wall 36 of the carriage, and a signal to the drive motor 48 causing the ball screw 44 to reverse rotation, the carriage 32 to return to the inlet station 26 to be placed in superposed relation about the next succeeding section of unperforated tube material, and the perforating process is then repeated.

The central control system 22 includes a comparator circuit 102 that is constantly reading a signal indicative of the speed of the tube material supplied by the extruder 14 and a signal indicative of the speed of the ball screw 44 from a second assembly 101 operatively associated with the drill head 32 and including an optical encoder and a sensor, ensuring that the two speeds are substantially identical and that the drill head and tube material are synchronized to move in unison during the perforating operation.

The central control system 22 is programmed for a desired operation and is connected to position indicators associated with the drill head to receive position signals from the drill head whereby to track and compare the actual position if the drill head with a desired position. Data is transmitted from the control system to the drill head and, motors or drive belts to control the operation of the apparatus, depending on the rate of tube material fed from the extruder.

The tube 12 from the extruder 14 is automatically, continuously advanced, perforated by the drill head moving in unison with the advancing tube end portion, severed from the advancing tube to form a tube section, whereupon the drill head is returned to be brought into register with the advancing tube from the extruder to start a new cycle.

FIG. 2 illustrates the result of the process herein wherein openings are formed in tubing advanced from the extruder. The length of tubing 12 has three sections marked off, each section denoting, respectively, the result of a first, second and third cycle (and a respective first, second and third tube section). Each tube section is severed from the advancing tube as a result of each cycle, the dotted lines indicating the cutting planes along which the advancing tube would be severed.

In the embodiment illustrated in FIG. 2, each tube section is provided with two linear rows of 14 drill holes or perforations (only one row of drill holes being shown), the drill holes being equidistantly spaced apart from one another by 4 inches and the last drill hole in each row being spaced 6 inches from the respective opposite end of the tube section.

Depending on the application, the following could be changed (i.e., increased or decreased) from that illustrated: the number of rows of drill holes, the number of drills and/or drill holes per row, the diameter of each drill hole, the spacing or distance between drill holes, or the spacing or distance of the last drilled hole in any row from the opposite end of the tube section. Additionally, by changing the inlet and outlet stations of the frame, the diameter of the tubing could be changed.

The apparatus herein discharges tube sections with accurately controlled lengths and equally spaced hole center distances at extremely high speed from the drill head. Because the drill bits move horizontally in unison with the tube fed thereinto by the extruder, the holes thus drilled through the tube wall are clean, round and very smooth.

Although the present invention has been described herein with respect to a specific embodiment thereof, it will be understood that the foregoing description is intended to be illustrative. Many modifications of the present invention will occur to those skilled in the art. All such modifications, which fall within the scope of the appended claims, are intended to be within the scope and spirit of the present invention.

What is claimed is:

1. A method of perforating hollow thin-walled tubing, the steps of the method comprising:

slidably mounting a drill head on a support frame for reciprocating movement between a tube receiving and a tube discharging station of said support frame, the drill head having opposite ends and at least one drill for forming an opening in the wall of the tubing, axially advancing the tubing at a predetermined speed from said tube receiving station to said tube discharging station, said advancing juxtaposing a length of tubing between the opposite ends of the drill head, simultaneously advancing the drill head in unison with the advancing tubing and without clamping the tubing and actuating the drill whereby to form an opening in the pipe while the drill head and tubing are moving, and discharging the perforated tube portion at said tube discharging station and returning said drill head to said tube receiving station to receive another section of unperforated tubing and repeat the process.

2. The method of claim 1, the steps of the method further including:

continuously supplying from an extruder unperforated tubing material to the tube receiving station and into the space between the ends of the drill head, and advancing and severing the length of perforated tubing that is between the ends of the drill head from the unperforated tubing being advanced.

3. Apparatus for automatically and continuously producing openings of selected diameter and spacing in hollow, thin-walled, unperforated polymeric tube material, the apparatus comprising:

first means for continuously moving the unperforated tube material along an axis in a first direction from a tube receiving station to a tube discharging station;

a drill head having axially-spaced end walls and at least one actuatable tool for forming an opening in the wall of said tube material, the drill head being adapted to position a length of unperforated tubing between the end walls and move from said receiving station to said discharging station when said length of unperforated tube material is positioned between the end walls; and second means for automatically moving said drill head in said first direction and oppositely in a second direction, said second means being operable to move said drill head in unison with said tube material and in said first direction to said tube discharging station whereat said tube is discharged and thereafter to move said drill head in said second direction to said tube receiving station whereat to receive a new length of unperforated tube material and to repeat the process, said second means operating to actuate said at least one tool and form an opening in said length of tubing while said drill head is moving in said first direction and from said tube receiving to said tube discharging station.

4. The apparatus as claimed in claim 3, further comprising:

a support frame, said support frame including said tube receiving and said tube discharging stations, and wherein said drill head is mounted on said support frame for axial slidable movement between the tube receiving and tube discharging stations, and said drill head includes a linear array of actuatable tools, each said actuatable tool including an actuatable drill bit for forming at least one opening in the wall of the tubing.

5. The apparatus of claim 3, wherein said second means comprises:

a threaded drive shaft journalled to said support frame for rotation relative thereto, a first drive motor for driving said drive shaft, and a screw nut fixedly connected to said drill head and threadably engaged with the thread on said threaded shaft, wherein rotation of said drive shaft transmits torque to the screw nut and depending on the sense of rotation of the drive shaft, axially moves the drill head, respectively, (a) in said first direction and away from said tube receiving station, and (b) in said second direction and towards said tube receiving station.

6. The apparatus of claim 3, wherein said first means comprises an extruder proximate to said tube receiving station, said extruder continuously supplying unperforated tubing to said drill head at a predetermined speed.

7. The apparatus of claim 6, and further comprising third means for cutting said tubing, said third means being proximate to said tube discharging station and comprising a tube cutter for severing, at the tube discharging station, the length of perforated tube material, advanced by the extruder and positioned between the ends of the drill head, from the next succeeding length of unperforated tube material advanced by the extruder.

8. The apparatus of claim 3, wherein said second means comprises:

a first assembly including an optical encoder and a sensor, said first assembly operably associated with said extruder to sense and provide a first signal indicative of the speed at which the unperforated extruded tubing is being fed to the drill head, a second assembly including an optical encoder and a sensor, said second assembly operably associated with said drill head to sense and provide a second signal indicative of the speed of the drill head, and a comparator to read and compare the first and second signals and generate and transmit a third signal to at least one said first and second assembly to adjust the speed of said extruder and said drill head, as needed, and ensure that the drill head and tubing are moving in unison with one another and at the same or substantially the same speed.

9. The apparatus of claim 8, further comprising:

a central server computer, and further wherein said comparator is operatively connected to said central server computer, and wherein said second means comprises:

a threaded drive shaft;

a drive motor for driving said drive shaft;

and further wherein said central server computer is programmed to read said third signal and when less than a predetermined value, to transmit a fourth signal to said drive motor to ensure that said drive motor rotates the threaded shaft at a rate that forces the drill head to move substantially in unison with the tubing supplied to the drill head.

10. The apparatus of claim 3, further wherein said at least one actuatable tool comprises a first and a second set of actuatable tools, wherein the first set of actuatable tools is actuatable independently of said second set of actuatable tools.

11. The apparatus of claim 10, wherein the wall of said tubing is generally cylindrical and defined by a series of succeeding peaks and valleys, and said drill are adapted to drill through either a peak or valley of said tubing wall.

12. The apparatus of claim 3, further comprising:

fourth means for supporting and positioning said length of tubing in said drill head.

13. The apparatus of claim 12, wherein said tubing is generally cylindrical and of a predetermined diameter and thickness, and said fourth means comprises:

an opening greater than the diameter of said tubing material in each said axially-spaced end wall of said drill head, an upper alignment cradle extending generally horizontally between said end walls and disposed, at least in part, in each said opening, said upper alignment cradle being disposed above the axial path of said tubing for inhibiting upward movement of said advancing tubing, and a lower alignment cradle extending generally horizontally between said end walls and disposed, at least in part, in each said opening, said lower alignment cradle being disposed below the axial path of said tubing for supporting and centering the advancing tubing between the end walls of said drill head.

14. The apparatus of claim 13, wherein said lower alignment cradle is movable vertically relative to said openings and to said upper alignment cradle, the vertical movement of the lower alignment cradle being adapted to accommodate, locate, and axially center tubing of different diameter with and along the axial path of said drill head.

15. The apparatus of claim 3, wherein said at least one actuatable tool comprises:

at least one drill spindle movable between a retracted position and an actuated position, a drill bit rotatably mounted in each said spindle, means for positioning each said drill spindle in either said retracted and said actuated positions, and drive means for driving each said drill spindle when the respective drill spindle is positioned in said actuated position.

16. The apparatus of claim 15, wherein said at least one drill spindle includes at least two of said drill spindles, and said drive means comprises a drive motor, and a drive belt connected to said drive motor and each of said drive spindles, energization of said drive motor operating to drive the drill bits in said drill spindles.

17. The apparatus of claim 16, wherein each drill spindle includes a sensor to indicate whether the drill spindle is in the retracted or actuated position, and further comprising a central server computer to control movement of said drill head, the sensor of each said drill spindle being operably connected to said computer.

18. The apparatus of claim 3, wherein said tubing is comprised of blow-moldable and vacuum formable polymeric material.

19. The apparatus of claim 18, wherein the material of said tubing is selected from the group consisting of polyethylene, HDPE, polyvinyl chloride, polypropylene, nylon, and Teflon.

20. The apparatus of claim 3, wherein the tubing is comprised of a corrugated wall interposed between generally smooth outer and inner walls, the corrugated wall being characterized by a continuous succession of peaks and valleys.

21. Apparatus for perforating corrugated multi-wall tubing as the tubing passes along an axial path thereof, the apparatus comprising:

a drill head having an inlet end wall spaced from an outlet end wall and an array of actuatable tools between said end walls, said drill head being movable between a tube receiving station and a tube discharging station, first means for advancing a length of tubing between said tube receiving and tube discharging stations, the advancing of said tubing positioning a length of tubing between the end walls of said drill head, second means for moving the drill head between said tube receiving and tube discharging stations and in unison with the length of tubing between the end walls of said drill head, and third means for actuating said actuatable tools while the drill head is moving between said tube receiving and tube discharging stations.

22. The apparatus of claim 21, wherein said first means for advancing comprises an extruder, said extruder being proximate to said tube receiving station for continuously supplying unperforated tubing to said drill head, and further comprising means for severing said tubing, said means for severing comprising a cutter blade proximate to said tube discharging station for cutting a perforated portion of tubing from said advancing unperforated tubing material when the drill head is proximate to said tube discharging station.

23. The apparatus of claim 21, wherein said drill head includes means for supporting and centering advancing tubing of different diameters in parallel relation with the axial path of said advancing tubing.

24. The apparatus of claim 23, wherein said means for supporting and centering comprises:

an opening in each of the end walls of said drill head sized to pass said advancing tubing, and an upper and lower cradle extending axially and generally horizontally between the end walls of said drill head, at least one said cradle being vertically movable relative to the other said cradle for centering the tubing axis in parallel relation to the axis of movement of said drill head.

25. The apparatus of claim 24, wherein each cradle is disposed, in part, in each of the openings, and said lower cradle is vertically movable relative to the upper cradle for centering and supporting the tubing relative to the drill head.

26. The apparatus of claim 21, further comprising:

a support frame for supporting said drill head, said supporting frame including opposite ends spaced axially with one end of said support defining said tube receiving station and the other end of said support defining said tube discharging station, and further wherein said second means comprises a threaded shaft, said shaft being axially elongated and extending generally horizontally between the opposite ends of said support frame, a threaded screw nut fixedly connected to said drill head and threadably engaged with said threaded shaft, and an actuatable drive motor drivingly connected to one said shaft and screw nut, actuation of said drive motor transmitting torque from the driven to undriven of said shaft and nut wherein to cause relative rotation therebetween and axial movement of the drill head.

27. The apparatus of claim 26, wherein said drive motor is drivingly connected to said threaded shaft to cause said shaft to rotate in opposite directions, one and the other direction causing said drill head, respectively, to move between said tube receiving station and said tube discharging station and oppositely between said tube discharging station to said tube receiving station.

28. The apparatus of claim 21, wherein said actuatable tools are arranged into at least two linear rows, each said actuatable tool comprises:

a cage fixedly mounted to the drill head for movement therewith, a drill spindle mounted in said cage for reciprocating movement relative to the cage and between a retracted position, remote to the advancing tubing, and a forward position, proximate to the advancing tubing for perforating the tubing material, a drill mounted for rotation in the drill spindle for perforating the tubing, means for reciprocating the drill spindle, and means for rotating said drill.

29. The apparatus of claim 28, wherein said means for rotating said drills comprises:

an endless drive belt interconnecting each said drill disposed in a respective row, and a drive motor for driving said drive belt and each said drill in said respective row, simultaneously.

30. The apparatus of claim 29, wherein said means for reciprocating the drill spindles disposed in a respective row comprises:

an actuator connectible to a source of pressurized air, and first and second sensors, respectively, to sense whether a drill spindle is in said retracted position and in said forward tube perforating position.

31. The apparatus of claim 30, wherein:

said first and second sensors, respectively, outputting a first output signal indicative of the position of the drill spindles and a second output signal indicative of whether the drills are actuated, said first means includes a third sensor for sensing the advancing tubing and the speed of said tubing and outputting a third output signal indicating same, and a fourth sensor for sensing that a predetermined length of tubing has advanced and outputting a fourth output signal indicating same, said second means includes a second drive motor to move said drill head oppositely between the tube receiving and tube discharging stations, and a central server computer, said computer connected to and receiving said output signals, said computer including a comparator for comparing the output signals and outputting various operation control signals, including:

a speed control signal to said second drive motor whereby to adjust the speed of said second drive motor when the drill head is moving from the tube receiving station to the tube discharging station and maintain the speed of the drill head substantially the same as the speed of the advancing tubing, a drill actuation signal to the drill spindles and drills whereby to actuate the drill spindles and drills when the predetermined length of unperforated tubing is juxtaposed with the drill head and the drill head is moving from the tube receiving to the tube discharging station, a drill cessation signal to the drill spindles and drills whereby to stop the drills and retract the spindles when the drill head reaches the tube discharging station, and an operation repeat signal to the second drive motor whereby to move the drill head from tube discharging station to the tube receiving station and repeat the process.

* * * * *